(12) United States Patent
Won et al.

(10) Patent No.: US 8,365,098 B2
(45) Date of Patent: Jan. 29, 2013

(54) METHOD AND APPARATUS FOR DISPLAYING KEY INFORMATION IN PORTABLE TERMINAL

(75) Inventors: Jong-Sang Won, Gumi-si (KR);
Gwang-Woo Choe, Daegu (KR);
Min-Bum Kim, Gumi-si (KR);
Jung-Sook Cha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 11/302,365

(22) Filed: Dec. 14, 2005

(65) Prior Publication Data

US 2007/0094616 A1    Apr. 26, 2007

(30) Foreign Application Priority Data

Oct. 26, 2005   (KR) .......................... 10-2005-101410

(51) Int. Cl.
*G06F 3/048* (2006.01)
(52) U.S. Cl. ........ 715/847; 715/711; 715/736; 715/776; 715/810; 715/811; 715/861; 715/827; 715/826; 455/566; 455/567
(58) Field of Classification Search .................. 715/530, 715/711, 736, 776, 810, 811, 819, 826, 847; 715/861, 835, 838, 851, 857; 455/566, 575; 345/594, 661, 671, 667, 682, 712.2, 473
See application file for complete search history.

(56) References Cited

U.S. PATENT DOCUMENTS

| | | | | |
|---|---|---|---|---|
| 5,742,808 A * | 4/1998 | Hasuo | ................................... | 1/1 |
| 5,796,394 A * | 8/1998 | Wicks et al. | ................... | 715/751 |
| 5,917,905 A | 6/1999 | Whipple et al. | | |
| 5,973,688 A * | 10/1999 | May | .............. | 715/709 |
| 6,047,197 A * | 4/2000 | Jarrad | ........................ | 455/566 |
| 6,463,304 B2 * | 10/2002 | Smethers | ..................... | 455/566 |
| 6,473,006 B1 * | 10/2002 | Yu et al. | ......................... | 341/23 |
| 6,907,273 B1 * | 6/2005 | Smethers | ..................... | 455/565 |
| 7,203,521 B2 * | 4/2007 | Lee et al. | ....................... | 455/564 |
| 2001/0003097 A1 * | 6/2001 | Jeoung | .......................... | 455/566 |
| 2001/0047300 A1 * | 11/2001 | Takashima et al. | ............. | 705/14 |
| 2002/0078143 A1 * | 6/2002 | De Boor et al. | ............... | 709/203 |
| 2002/0090081 A1 * | 7/2002 | Kitamura | ................ | 379/433.07 |
| 2003/0064757 A1 * | 4/2003 | Yamadera et al. | ............. | 455/566 |
| 2003/0100347 A1 * | 5/2003 | Okada et al. | ................... | 455/567 |

(Continued)

FOREIGN PATENT DOCUMENTS

| CN | 1270479 A | 10/2000 |
|---|---|---|
| EP | 1 033 644 A2 | 9/2000 |

(Continued)

OTHER PUBLICATIONS

Microsoft Office Outlook 2003, Micorsoft Corporation; Copyringt 1995-2003; Part of Microsoft Office Professional Edition 2003'; 3 pages.*

*Primary Examiner* — Steven Sax
*Assistant Examiner* — Linh K Pham
(74) *Attorney, Agent, or Firm* — Roylance, Abrams, Berdo & Goodman, LLP

(57) ABSTRACT

A method and apparatus are disclosed for displaying key information in a portable terminal. Display of key information is provided such that a user can easily confirm information about a shortcut key set by the user or a function for each key of a key input module.

12 Claims, 5 Drawing Sheets

| U.S. PATENT DOCUMENTS | | | | | FOREIGN PATENT DOCUMENTS | | | |
|---|---|---|---|---|---|---|---|---|
| 2004/0044739 A1* | 3/2004 | Ziegler | 709/213 | EP | 1434411 A1 | | 6/2004 |
| 2004/0085360 A1* | 5/2004 | Pratt et al. | 345/773 | FR | 2837942 A1 | | 10/2003 |
| 2004/0119755 A1* | 6/2004 | Guibourge | 345/827 | JP | 2004-360824 | * | 12/2004 |
| 2004/0132432 A1* | 7/2004 | Moores et al. | 455/413 | KR | 2002-0084784 | * | 4/2001 |
| 2004/0199871 A1* | 10/2004 | Lee | 715/513 | KR | 2003079543 | * | 10/2003 |
| 2004/0263479 A1* | 12/2004 | Shkolnikov | 345/169 | KR | 20010024220 | * | 12/2003 |
| 2005/0079895 A1* | 4/2005 | Kalenius et al. | 455/566 | KR | 20030079543 | * | 4/2004 |
| 2005/0248527 A1* | 11/2005 | Scott | 345/156 | KR | 2005-89277 | | 9/2005 |
| 2005/0285931 A1* | 12/2005 | Maruyama et al. | 348/14.01 | | | | |
| 2006/0015823 A1* | 1/2006 | Chao et al. | 715/823 | * cited by examiner | | | |

METHOD AND APPARATUS FOR DISPLAYING KEY INFORMATION IN PORTABLE TERMINAL

PRIORITY

This application claims the benefit under 35 U.S.C. §119 (a) of Korean Patent Application No. 2005-101410, filed in the Korean Intellectual Property Office on Oct. 26, 2005, the entire content of which is hereby incorporated by reference.

BACKGROUND OF THE INVENTION

1. Field of the Invention:

The present invention relates to a portable terminal. More particularly, the present invention relates to a method and apparatus for displaying key information, which is set corresponding to keys in a portable terminal.

2. Description of the Related Art:

As various functions of a portable terminal are developed, users set shortcut keys for menus which are frequently used. Accordingly, users can easily approach menus using preset shortcut keys so as to quickly perform various functions of a portable terminal. However, conventionally, users must execute a shortcut key function by approaching a shortcut key setting menu in order to confirm information about preset shortcut keys or keys of a key input module.

SUMMARY OF THE INVENTION

The present invention has been made to address the above-mentioned problems occurring in the prior art. Accordingly, an object of the present invention is to provide a method and apparatus for easily confirming information set for keys input by a user or preset keys of a key input module.

To accomplish the above object, aspects of the present invention provide a method and apparatus for displaying key information in a portable terminal, where setting information about a standby screen image is determined, preset key information corresponding to each key is determined when it is set such that the key information is displayed on the standby screen image as the determination result, and the determined key information is displayed.

BRIEF DESCRIPTION OF THE DRAWINGS

The above and other objects, exemplary features and advantages of the present invention will be more apparent from the following detailed description taken in conjunction with the accompanying drawings, in which.

Throughout the drawings, like reference numbers should be understood to refer to like elements, features, and structures.

DETAILED DESCRIPTION OF EXEMPLARY EMBODIMENTS

Figure 1:
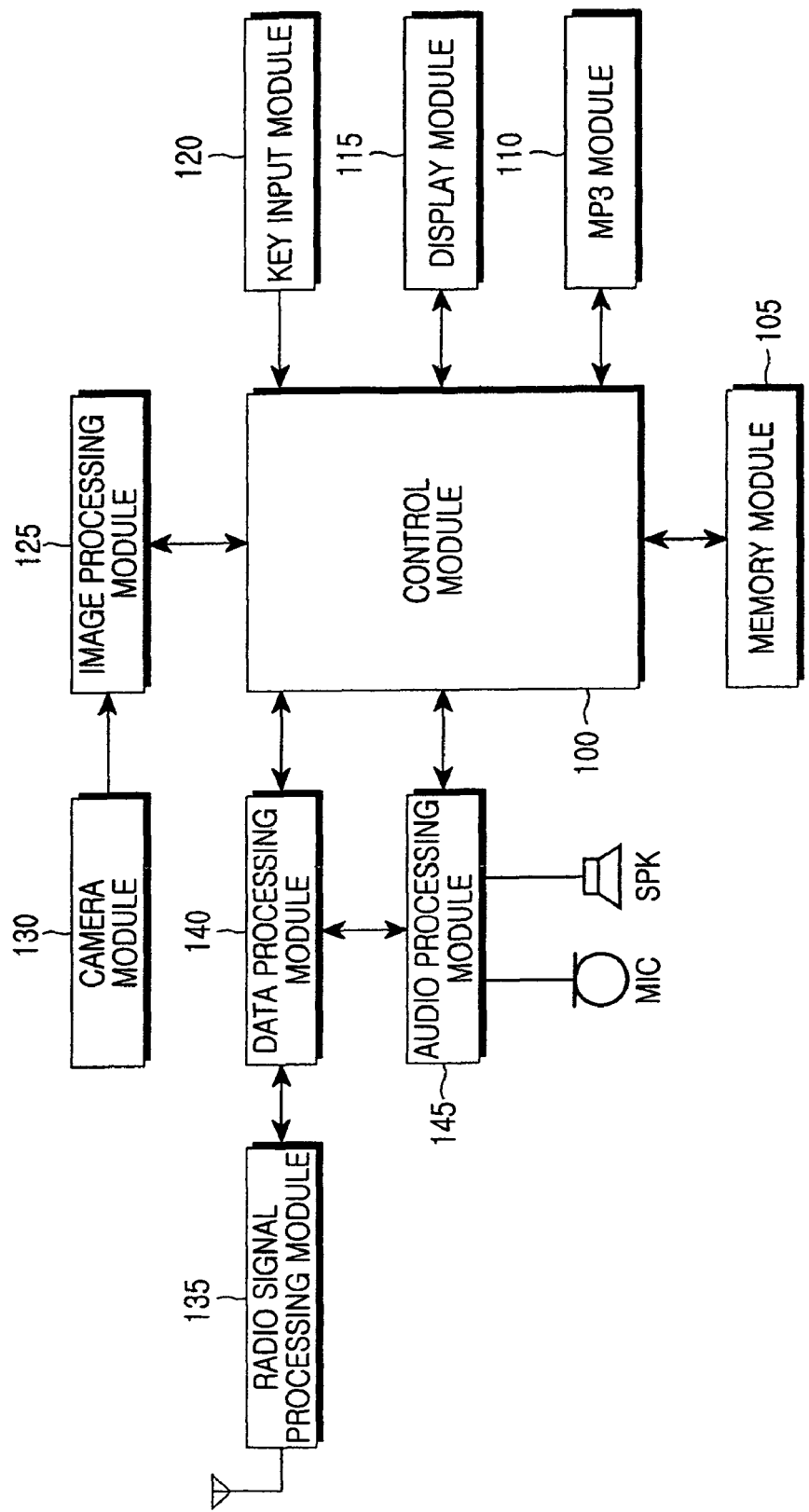
FIG. 1 is a block diagram illustrating the structure of a portable terminal according to an exemplary embodiment of the present invention.

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Hereinafter, exemplary embodiments of the present invention will be described in detail with reference to the accompanying drawings. As noted above, the same or similar components in drawings are designated by the same reference numerals although they may be shown in different drawings.

According to an aspect of the present invention, key information comprises information regarding a function set for a shortcut key received from a user or a function corresponding to each key of a key input module. Hereinafter, according to an exemplary embodiment of the present invention, information about a shortcut key set from a user will be described as the key information.

FIG. 1 is a block diagram illustrating the structure of a portable terminal according to an exemplary embodiment of the present invention. A control module 100 directs an operation of the portable terminal. When receiving a signal for setting a shortcut key from a user, the control module 100 displays a menu allowing the setting of a shortcut key according to the signal. Thereafter, the control module 100 directs memory module 105 to store shortcut key information set from the user. When it is set that short cut key information or key information is displayed on a standby screen image, the control module 100 performs a control operation in such a manner that the key information is displayed on the standby screen image when detecting an on-state of the standby screen image. At this time, the control module 100 controls a display module 115 to display a key array image of the key input module and to sequentially display information about each key on the key array image. If the control module 100 receives a signal indicating display of key information from a user in a specific mode, the control module 100 performs a control operation in such a manner that key information corresponding to keys included in the portable terminal is displayed.

Memory module 105 comprises program memory and data memory. The program memory stores programs for controlling general operations of the portable terminal. The memory module 105 according to an exemplary embodiment of the present invention stores shortcut key information set from a user. Additionally, in a function set as a shortcut key, the memory module 105 stores data received from a user and outputs information about the data to the control module 100 when the key information is displayed.

An MPEG-Audio Layer-3 (MP3) module 110 processes an MP3 audio file coded in an MP3 format received from a user, which is stored in the memory module 105 by a user, so as to send MP3 audio data to the control module 100. In addition, the MP3 module 110 outputs audio data received from the control module 100 to a speaker or an earphone through a data processing module 140 and an audio processing module 145 so as to provide high quality music to a user.

The display module 115 displays a current state and each process and operation state of the control module 100 according to key input from a key input module 120. In addition, the display module 115 displays image data output in an image processing module 125 and a user interface showing the execution of a photographing function. Display module 115 can employ a liquid crystal display (LCD). While using an LED display, the display module 115 comprises an LCD controller, a memory capable of storing image data, and an LCD display element. If the LCD is realized through a touch screen scheme, the key input module 120 and the LCD can be an input module. The display module 115 comprises an image data display module outputting image data. The display module 115 according to an exemplary embodiment of the present invention displays messages and icons allowing the setting of shortcut key information by a user. Accordingly, the display module 115 displays key information corresponding to each key of the key input module 120. In addition, when displaying the key information, the display module 115 displays a key pad image of a key input module and key information corresponding to keys on the displayed key pad image. The display module 115 can sequentially display a plurality of key information.

The key input module 120 comprises keys used for inputting numeric and character information and function keys used for setting various functions. The key input module 120 according to an exemplary embodiment of the present invention allows a user to set shortcut keys for frequently used menus. In addition, the key input module 120 allows the control module 100 to realize various function settings for the shortcut key or each key through the input of the set shortcut key.

A camera module 130 photographs image data and comprises a camera sensor for converting a photographed optical signal into an electrical signal. Herein, the camera sensor can comprise a CCD sensor. The image processing module 125 generates an image data for displaying image signals. The image processing module 125 transmits an image signal received under the control of the control module 100 corresponding to the standard of the display module 115. The image processing module 125 compresses and expands the image data. In addition, the camera 130 and the image processing module 125 can be one camera module.

An radio signal processing module 135 provides communication capability for the portable terminal. The radio signal processing module 135 comprises an radio frequency (RF) transmitter for up-converting and amplifying a signal to be transmitted by the portable terminal and an RF receiver for low-noise amplification of a received signal and down-converting the frequency of the received signal.

The data processing module (MODEM) 140 comprises a transmitter for coding and modulating the transmitted signal and a receiver for demodulating and decoding the received signal.

The audio processing module 145 can be constructed using a codec including a data codec for processing packet data, and an audio codec for processing an audio signal such as a voice signal. The audio processing module 145 converts a digital audio signal received in the data processing module 140 into an analog signal through the audio codec and reproduces the analog signal. The audio processing module 145 converts a transmitted analog audio signal generated from the microphone into a digital audio signal through the audio codec and transmits the digital audio signal to the data processing module 140. The codec can be separated from the audio processing module 145 or can be included in the control module 105. The audio processing module 145 according to an exemplary embodiment of the present invention can output various sound effects when information about a shortcut key is displayed through a speaker connected to the audio processing module 145. In addition, the audio processing module 145 outputs a beep sound and an informing sound when a user inputs a shortcut key.

Figure 2:
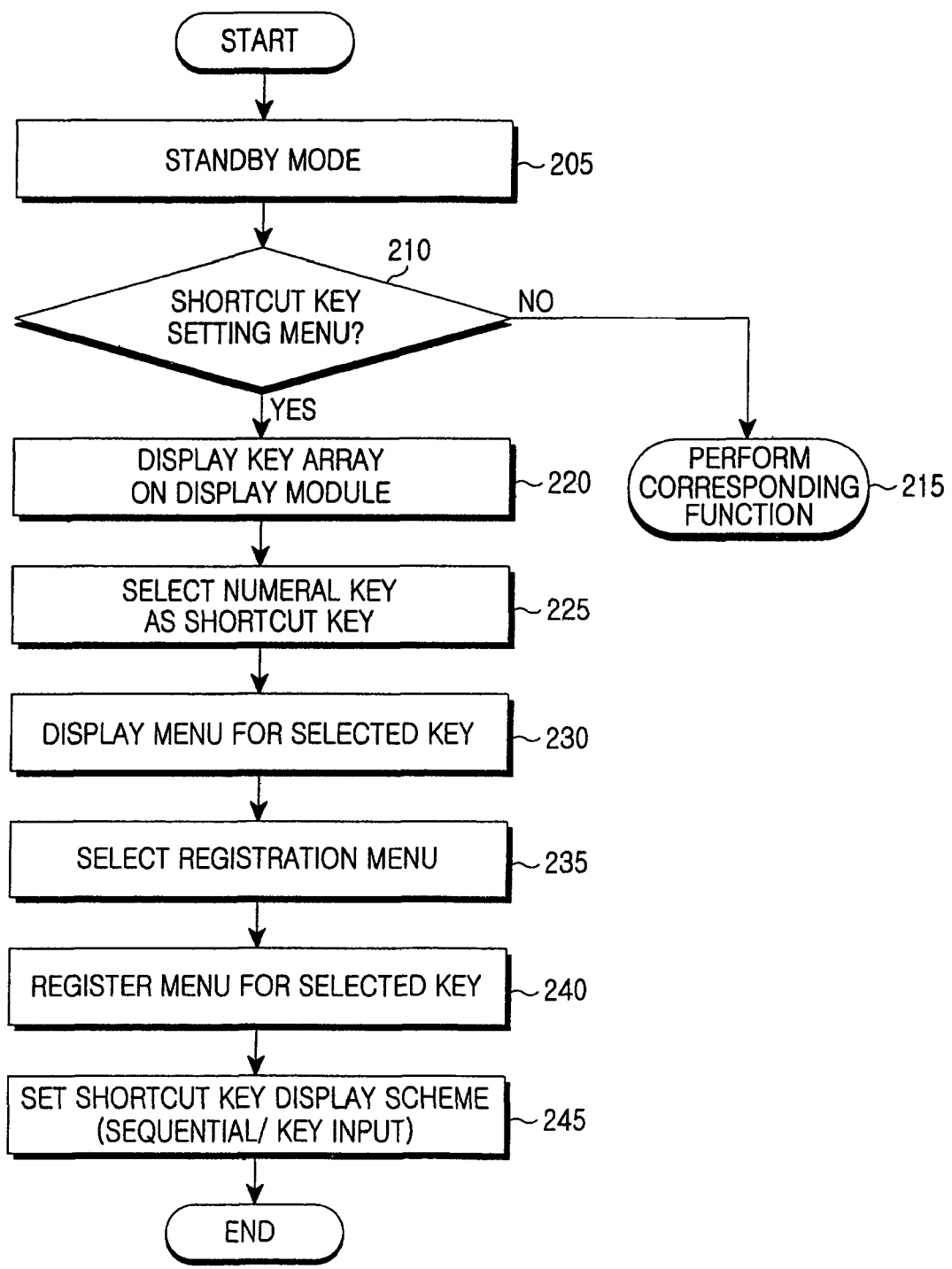
FIG. 2 is a flowchart illustrating an operation of setting a shortcut key according to an exemplary embodiment of the present invention.
Figure 3C:
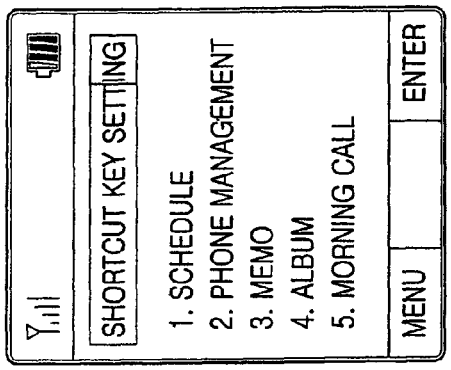
FIGS. 3A to 3E are views illustrating an example of a screen image when a shortcut key is set according to an exemplary embodiment of the present invention.
Figure 3E:
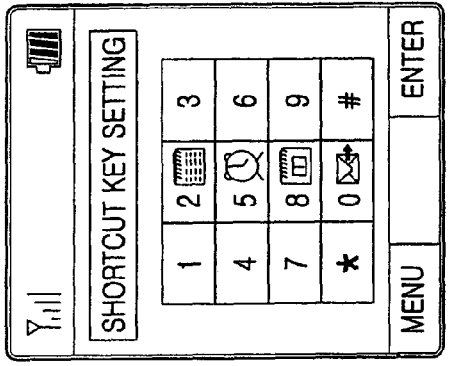
Figure 3B:
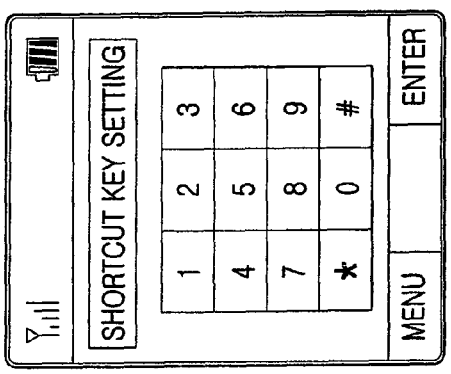
Figure 3D:
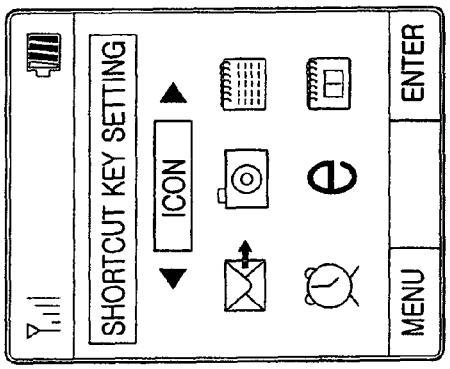
Figure 3A:
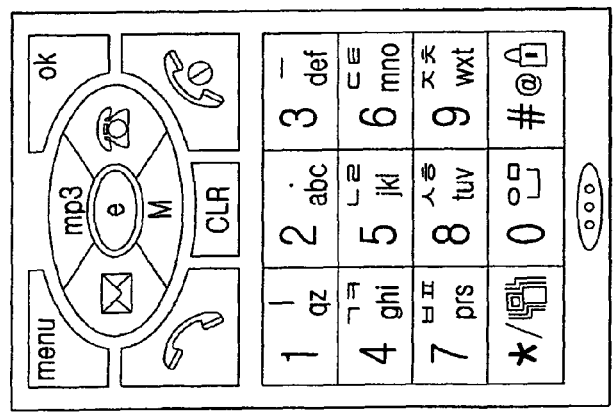

FIG. 2 is a flowchart illustrating an operation of setting a shortcut key in a portable terminal according to an exemplary embodiment of the present invention. FIG. 3A is a view illustrating an example of a screen image when a shortcut key is set according to an exemplary embodiment of the present invention. The control module 100 of the portable terminal performs a standby mode 205. If the control module 100 detects a key signal input in a standby mode 205, the control module 100 determines whether the key signal is input in order to execute a menu for setting a shortcut key in step 210. If the input key signal is not a key signal for executing a menu for setting a shortcut key, the control module 100 performs a control operation in such a manner that a function corresponding to the input key signal is performed in step 215. In contrast, if the input key signal is a key signal for executing a menu for setting a shortcut key, the control module 100 directs the display module 115 to display a key array image enabling a shortcut key for the key input module to be set as shown in FIG. 3B in step 220.

The control module 100 selects a numeric key to be set as a shortcut key from the key array image displayed on the display module 115 using a numeric key or a directional key of the key input module 120 in step 225. The control module 100 controls the display module 115 to display various menu items of the portable terminal as shown in FIG. 3C in step 230 such that a menu to be registered for the selected key is selected. The control module 100 performs step 235 such that a menu to be set for the key selected in step 225 is selected among displayed various menu items. The control module 100 additionally allows the registration of an icon for the selected shortcut key menu according to user selection as shown in FIG. 3D.

The control module 100 registers a menu item, which is selected in step 235 corresponding to the shortcut key selected in step 225, and stores the menu item in the registered memory module 105 in step 240. Thereafter, when the control module 100 displays key information in the standby screen image, the control module 100 performs step 245 such that a scheme of displaying the key information is set. When there are multiple pieces of key information, the key information set in step 245 can be displayed in sequence or through a predetermined key input. According to an embodiment of the present invention, key information can be sequentially displayed as a example. If the shortcut key setting is completed, the control module 100 controls a control operation such that brief information about a shortcut key set from the user is displayed as shown in FIG. 3E.

Figure 4:
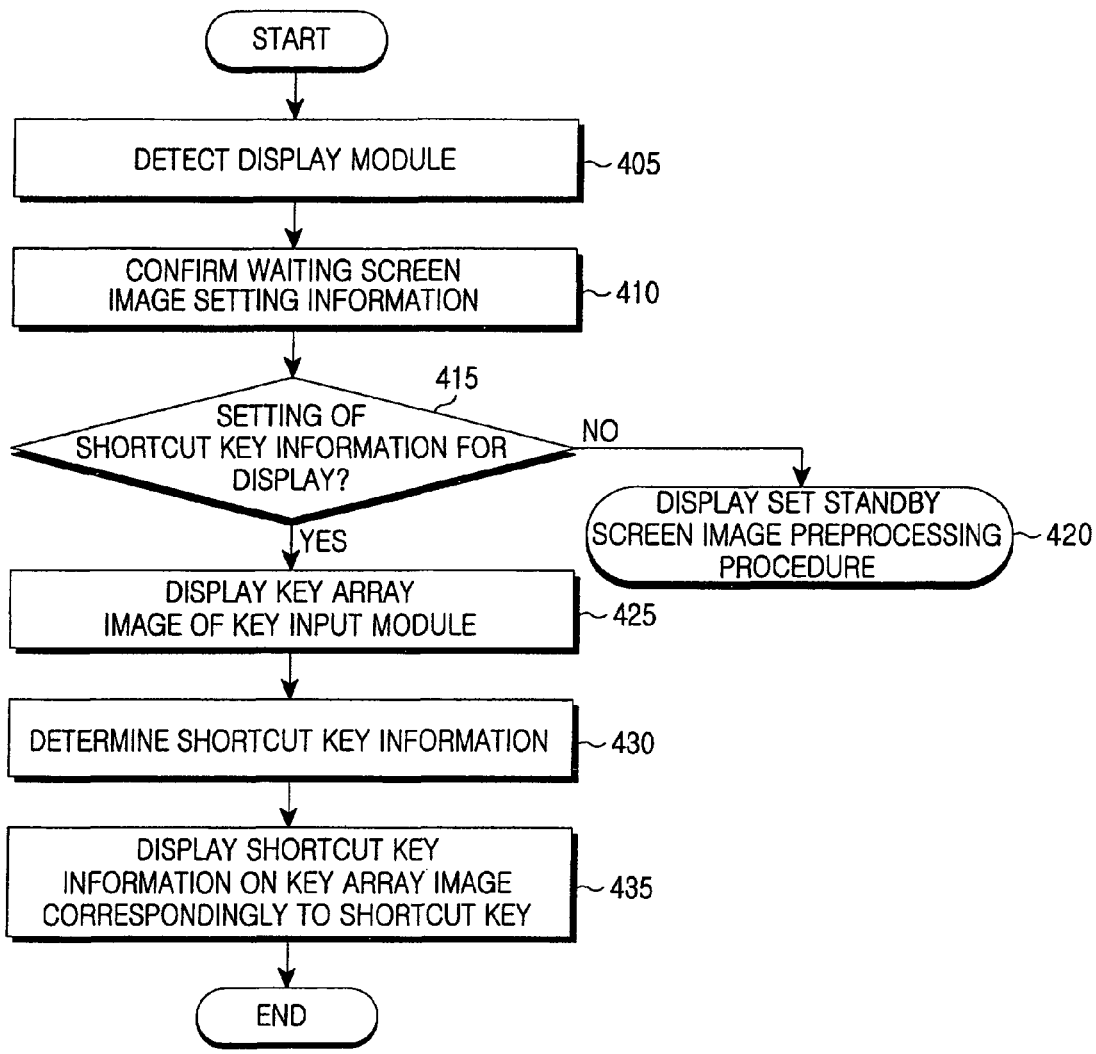
FIG. 4 is a flowchart illustrating an operation of displaying key information according to an exemplary embodiment of the present invention.

FIG. 4 is a flowchart illustrating an operation of displaying key information in the portable terminal according to an exemplary embodiment of the present invention. According to an exemplary embodiment of the present invention, the key information can be displayed in a standby mode. Referring to FIG. 4, in step 405, the control module 100 opens a folder of the portable terminal or detects that illumination of the display module 115 is turned off according to key input. Thereafter, the control module 100 determines setting information about a standby screen image to be displayed on the display module 115 in step 410. In step 415, according to the determined standby screen image setting information, the control module 100 determines whether the standby screen image is set in such a manner that shortcut key information is displayed on the standby screen image. If it is determined that the standby screen image is not set in such a manner that the shortcut key information is displayed on the standby screen image as the determination result, the control module performs step 420 such that a corresponding set standby screen image is displayed. In contrast, if it is determined that the standby screen image is set in such a manner that the shortcut key information is displayed on the standby screen image as the determination result of step 415, the control module performs step 425 such that a key array image of the key input module 120 is displayed on the display module 115.

Figure 5A:
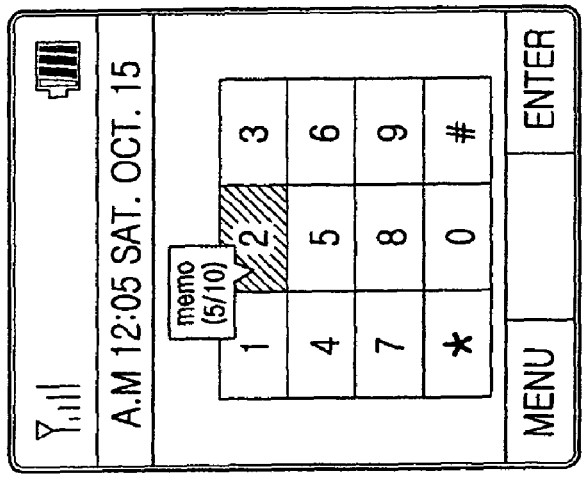
FIGS. 5A to 5C are views illustrating an example of a screen image when shortcut key information is displayed according to an exemplary embodiment of the present invention.
Figure 5B:
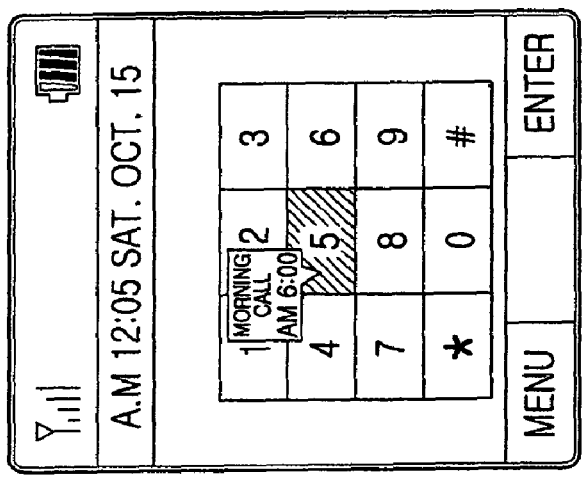
Figure 5C:
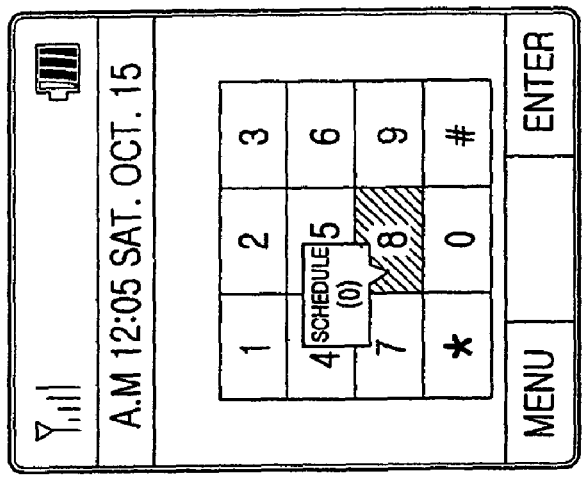

In step 430, the control module 100 determines shortcut key information to be displayed, which is previously set by a user. The control module 100 performs a control operation such that shortcut key information corresponding to keys set as shortcut keys are displayed on the key array image, step 435, which is displayed on the display module 115 according to the determined shortcut key information as shown in FIGS. 5A to 5C. In other words, the control module 100 controls the display module 115 to display a key pad image. In addition, the control module 100 displays shortcut key information on a numeric key area corresponding to a shortcut key set from a user in the displayed key pad image such that the shortcut key information corresponds to the numeric key.

FIGS. 5A to 5C depicts views illustrating a case where several pieces of shortcut key information is sequentially displayed when a waiting screen image is set in such a manner that the waiting screen image displays the shortcut key information. Hereinafter, an operation of displaying key information according to an exemplary embodiment of the present invention will be described with reference to FIG. 5. FIG 5A illustrates a case where shortcut key information is displayed when a user sets a memo menu item for a numeric key of "2." The shortcut key information comprises contents about a menu item corresponding to the numeric key and the number of stored data when there are the data input from a user corresponding to the menu item. Therefore, FIG 5A shows that there are five data input from a user with respect to a memo menu item corresponding to a shortcut key of "2." FIG 5B illustrates shortcut key information for a numeric key of "5" when a predetermined time elapses after shortcut key information shown in FIG. 5A is displayed, or when a predetermined key input is detected. The shortcut key information for the numeric key of "5" corresponds to an alarm menu item, and shortcut key information including preset alarm information is displayed. FIG. 5C illustrates shortcut key information for a schedule menu item set on a numeric key of "8" after an image shown in FIG. 5C is displayed. The shortcut key information according to the schedule menu item is displayed with the number of schedules preset and registered by a user.

According to an exemplary embodiment of the present invention, a case where several pieces of shortcut key information is sequentially displayed on a standby screen image in a standby mode is described. Although it is not shown, according to another exemplary embodiment of the present invention, the control module can display shortcut key information set from a user and a function corresponding to each key of the key input module when a predetermined key is input in a specific mode. When a predetermined signal which allows the display of information about a shortcut key set from the user and each key function of the key input module 120 is input in a specific mode, the control module 100 can display key information for each key by overlapping with an image displayed in the specific mode. In addition, when a predetermined signal indicating the display of key information is input, the control module 100 can display a preset shortcut key or a preset key list. Thereafter, the control module 100 receives at least one key in the displayed key list selected by a user and displays key information corresponding to the selected key.

In addition, according to still another exemplary embodiment of the present invention, when a shortcut key corresponding to each menu is set, and shortcut key information is displayed with the operation of the short key, the function of the shortcut key can be flexibly changed upon the operation of the shortcut key depending on menus to be executed, or if there are no preset data corresponding to the shortcut key function. For example, when a predetermined shortcut key is registered for a schedule menu, and information about the shortcut key is displayed, a predetermined schedule list is displayed if there is the schedule menu, or an input mode capable of registering schedules is executed if there is no schedule menu. In addition, the preset shortcut key can be flexibly changed according to menus in a specific mode.

While the present invention has been particularly shown and described with reference to certain exemplary embodiments thereof, it will be understood by those of ordinary skill in the art that various changes in form and detail may be made therein without departing from the spirit and scope of the present invention. Consequently, the scope of the invention should not be limited to the exemplary embodiments, but should be defined by the appended claims and equivalents thereof.

What is claimed is:

1. A method for displaying shortcut key information set by a user in a portable terminal having a plurality of numeric keys, the method comprising:

while in a standby mode, displaying an array of numeric keys in a keypad on a standby screen image of the portable terminal when it is determined that setting information indicative of a standby screen image is set such that the standby screen image displays shortcut key information;

determining shortcut key information corresponding to a numeric key when the numeric key is set to display a shortcut key information; and displaying an icon indicative of the shortcut key information superimposed on its corresponding numeric key on the standby screen image;

wherein, the shortcut key information corresponding to the numeric key can be flexibly set and changed by the user according to a menu of the portable terminal;

wherein the shortcut key information corresponding to the numeric key is set to execute one menu function item selected from a plurality of menu function items corresponding to plural menu functions of the portable terminal;

wherein the icon includes a name of a menu function set to the corresponding numeric key and present condition information of the set menu function;

wherein the displaying an icon indicative of the shortcut key information comprises, when the shortcut key information is determined for a plurality of numeric keys, sequentially displaying, after a predetermined period of time, the icons indicative of the shortcut key information corresponding to each of the plurality of numeric keys; and wherein the icons indicative of shortcut key information comprises corresponding data input by a user that is indicative of a menu item corresponding to the shortcut key information.

2. The method as claimed in claim 1 wherein the shortcut key information comprises information related to at least one of a function corresponding to a numeric key set by a user and a preset function corresponding to at least one numeric key.

3. The method as claimed in claim 1, wherein the shortcut key information is preset.

4. The method of claim 1, wherein the method comprises displaying, in a waiting screen, shortcut key information of a menu function corresponding to the menu function set by the user corresponding with a numeric key of the portable terminal.

5. A method for displaying shortcut key information in a portable terminal having a plurality of numeric keys, the method comprising:
   receiving a signal requesting display of the shortcut key information related to a preset function corresponding to a numeric key; and
   displaying an array of numeric keys in a keypad and for each key, an icon indicative of shortcut key information corresponding to a numeric key superimposed on its corresponding numeric key, wherein, the shortcut key information corresponding to the numeric key can be flexibly set and changed by a user according to a menu of the portable terminal;
   wherein the shortcut key information corresponding to the numeric key is set to execute one menu function item selected from a plurality of menu function items corresponding to plural menu functions of the portable terminal;
   wherein the icon includes a name of a menu function set to the numeric key and present condition information of the set menu function;
   wherein the displaying an icon indicative of the shortcut key information comprises, when the shortcut key information is determined for a plurality of numeric keys, sequentially displaying, after a predetermined period of time, the icons indicative of the shortcut key information corresponding to each of the plurality of numeric keys; and
   wherein the icons indicative of shortcut key information comprises corresponding data input by a user that is indicative of a menu item corresponding to the shortcut key information.

6. The method as claimed in claim 5, wherein the displaying comprises displaying shortcut key information according to a user input of a specific key or a user input of a menu.

7. The method as claimed in claim 5, wherein the shortcut key information superimposed on the displayed array of numeric keys comprises an icon indicative of a function corresponding to the shortcut key information.

8. The method as claimed in claim 5, the method further comprising:
   displaying a list of numeric keys set for a corresponding function when the signal requesting the display of the shortcut key information is received;
   receiving information from the user indicative of the corresponding function of a numeric key selected by the user; and
   displaying the information indicative of the corresponding function set on the selected key.

9. The method as claimed in claim 5, wherein the displaying of the shortcut key information comprises, when multiple pieces of shortcut key information to be displayed exist, sequentially displaying, after a predetermined period of time, each of the multiple pieces of shortcut key information.

10. The method as claimed in claim 5, wherein the shortcut key information comprises corresponding data input by a user that is indicative of a menu item corresponding to the shortcut key information.

11. A portable terminal having a plurality of numeric keys, the portable terminal comprising:
    a control module that directs operation of the portable terminal and determines information about a standby screen image;
    a memory module that stores programs to facilitate the control module in general operation of the portable terminal;
    a display module that displays at least one of a current state, operation, and process of the portable terminal;
    a key input module that inputs at least one of numeric data and character data into the portable terminal; and
    a data processing module comprising a transmitter that codes and modulates a signal to be transmitted, and a receiver that demodulates and a signal received,
    wherein, while in a standby mode, when setting information about a standby screen image is determined by the control module as being set to display shortcut key information, the standby screen image displays on the display module, an array of numeric keys in a keypad and an icon for each key indicative of shortcut key information corresponding to a numeric key when the numeric key is set to display shortcut key information, wherein, the shortcut key information is superimposed on its corresponding numeric key, and wherein, the shortcut key information can be flexibly changed by a user according to a menu of the portable terminal;
    wherein the shortcut key information corresponding to the numeric key is set to execute one menu function item selected from a plurality of menu function items corresponding to plural menu functions of the portable terminal; and
    wherein the icon includes a name of a menu function set to the numeric key and present condition information of the set menu function;
    when the shortcut key information is determined for a plurality of numeric keys, sequentially displaying, after a predetermined period of time, the icons indicative of the shortcut key information corresponding to each of the plurality of numeric keys; and
    wherein the icons indicative of shortcut key information comprises corresponding data input by a user that is indicative of a menu item corresponding to the shortcut key information.

12. The portable terminal of claim 11, wherein when shortcut key information is set for a plurality of numeric keys, each of the respective shortcut key information is sequentially displayed on the standby screen image after a predetermined period of time.

* * * * *